United States Patent [19]
Wade et al.

[11] Patent Number: 5,878,227
[45] Date of Patent: Mar. 2, 1999

[54] SYSTEM FOR PERFORMING DEADLOCK FREE MESSAGE TRANSFER IN CYCLIC MULTI-HOP DIGITAL COMPUTER NETWORK USING A NUMBER OF BUFFERS BASED ON PREDETERMINED DIAMETER

[75] Inventors: Jon P. Wade, Wellesley; Steven K. Heller, Chelmsford, both of Mass.

[73] Assignee: Sun Microsystems, Inc., Palo Alto, Calif.

[21] Appl. No.: 674,277

[22] Filed: Jul. 1, 1996

[51] Int. Cl.[6] ................................................. G06F 13/00
[52] U.S. Cl. ............................. 395/200.65; 395/200.68; 370/229
[58] Field of Search .................... 395/800.29, 200.73, 395/200.65, 200.68; 370/248, 232, 473, 415, 406, 418, 230, 229

[56] References Cited

U.S. PATENT DOCUMENTS

| | | | |
|---|---|---|---|
| 4,616,359 | 10/1986 | Fontenot | 370/230 |
| 4,623,996 | 11/1986 | McMillen | 370/418 |
| 4,742,511 | 5/1988 | Johnson | 370/406 |
| 4,780,870 | 10/1988 | McHarg et al. | 370/415 |
| 4,930,122 | 5/1990 | Takahashi et al. | 370/473 |
| 5,347,450 | 9/1994 | Nugent | 395/200.73 |
| 5,400,329 | 3/1995 | Tokura et al. | 370/232 |
| 5,544,154 | 8/1996 | Glitho | 370/248 |
| 5,583,990 | 12/1996 | Birrittella et al. | 395/800.29 |

OTHER PUBLICATIONS

W. Dally, "Virtual–Channel Flow Control," IEEE Transactins On Parallel And Distributed Systems, vol. 3, No. 2, Mar. 1992, pp. 194–205.

G. Pifarre, et al., "Fully–Adaptive Minimal Deadlock—Free Packet Routing In Hypercubes, Meshes and Other Networks," Proc. 3d Annual ACM Symp. on Parallel Algorithms and Architectures, 1991.

P. Berman, et al., "Adaptive Deadlock– and Livelock–Free Routing With All Minimal Paths In Torus Networks," Proc. ACM Symp. on Parallel Algorithms and Architectures, 1992.

*Primary Examiner*—Le Hien Luu
*Attorney, Agent, or Firm*—Richard A. Jordan

[57] ABSTRACT

In brief summary, the invention provides a new message packet transfer system, which may be used in, for example, a multiprocessor computer system. The message packet transfer system comprises a plurality of switching nodes interconnected by communication links to define at least one cyclical packet transfer path having a predetermined diameter. The switching nodes may be connected to, for example, digital data processors and memory to form processing nodes in an multiprocessor computer system, and/or to other sources and destinations for digital data contained in the message packets. The switching nodes transfer message packets each from a respective one of the switching nodes as a respective source switching node to a respective one of the switching nodes as a respective destination switching node. At least one of the switching nodes has a plurality of buffers for buffering a corresponding plurality of message packets that it (that is, the at least one of the switching nodes) receives from another of said switching nodes during a message transfer operation, which ensures that deadlock does not occur during the message transfer operation.

30 Claims, 2 Drawing Sheets

SYSTEM FOR PERFORMING DEADLOCK FREE MESSAGE TRANSFER IN CYCLIC MULTI-HOP DIGITAL COMPUTER NETWORK USING A NUMBER OF BUFFERS BASED ON PREDETERMINED DIAMETER

FIELD OF THE INVENTION

The invention relates generally to the field of digital computer systems and more particularly to multiprocessor computer systems interconnected by cyclic interconnection networks that provide for deadlock-free message transfer.

BACKGROUND OF THE INVENTION

A number of types of multiprocessor computer systems have been developed which integrate a number of processors to increase the system's processing power beyond that which can be provided by a single processor. In a multiprocessor computer system, a plurality of processing nodes are interconnected by communication links which may comprise any suitable mechanism for transferring digital information, including, for example, wires, optical fibers, and the like.

A variety of types of interconnection arrangements have been developed for interconnecting processors in a multiprocessor computer system designed according to the distributed memory model, organized in a number of topologies. For small systems, comprising two or three processing nodes, a simple bus to which all processing nodes are connected may suffice. However, as the number of processing nodes increases, contention for the bus increases, which can slow down information transfer and the processing capability of the respective systems.

Most interconnection topologies that have been proposed, studied and/or implemented, other than the aforementioned bus arrangement, have been developed for systems including a large number of processing nodes, in particular, systems numbering in the hundreds or thousands of processing nodes. However, many systems that are desired commercially are much smaller, having, for example, as few as four or five processing nodes, up to as many as fifteen to twenty. For such systems, interconnection topologies that have been developed for large systems are often not economical. Another problem with such interconnection topologies is that they are typically based on the assumption that the systems with which they are to be used includes a number of processing nodes corresponding to a power of two, and will be most economical for those numbers of processing nodes. If, for example, such a system is required to have a number of processing nodes corresponding to a power of two, it may be necessary to increase the interconnection subsystem considerably even if it is desired to increase the number of processing nodes by only one.

The aforementioned Heller, et al., patent application describes a number of interconnection subsystems for efficiently interconnecting small numbers of nodes, each having a selected "degree", or "radix", (that is, or number of connections to communication links) in a multiprocessor computer system. In a number of the interconnection subsystems described in the Heller, et al., patent application, all of the nodes are of degree "three", so that each processing node can connect to as many as three communication links. Generally, the interconnection subsystems described in the Heller, et al., patent application are effective for interconnecting from as few as two nodes to as many as fifteen to twenty nodes, with no power-of-two limitation.

One problem that can arise in connection with interconnection subsystems such as those described in the Heller, et al., patent application is that deadlocks can develop in transferring information among the processing nodes. Deadlocks can arise in multiprocessor computer systems in a variety of ways; one way in which a deadlock can arise in an interconnection subsystem described in the Heller, et al., patent application is if a number of processing nodes are attempting to concurrently transfer information to and/or through the same processing node. In that case, the processing nodes which are attempting to transfer information will be requiring use of the same resources at the processing node to or through which the information is to be transferred. Since the resources can only be used for the information transfer by one of the processing nodes, all of the processing nodes which need to transfer information are blocked from proceeding. Since such a condition can arise, an interconnection subsystem is only useful if it can be provided with resources to ensure that deadlock cannot occur.

SUMMARY OF THE INVENTION

The invention provides a new and improved system and method for performing deadlock free message transfer in a cyclic multi-hop digital computer network that may be used in a multiprocessor computer system.

In brief summary, the invention provides a new message packet transfer system, which may be used in, for example, a multiprocessor computer system. The message packet transfer system comprises a plurality of switching nodes interconnected by communication links to define at least one cyclical packet transfer path having a predetermined diameter. The switching nodes may be connected to, for example, digital data processors and memory to form processing nodes in an multiprocessor computer system, and/or to other sources and destinations for digital data contained in the message packets. The switching nodes transfer message packets each from a respective one of the switching nodes as a respective source switching node to a respective one of the switching nodes as a respective destination switching node. At least one of the switching nodes has a plurality of buffers for buffering a corresponding plurality of message packets that it (that is, the at least one of the switching nodes) receives from another of said switching nodes during a message transfer operation, which ensures that deadlock does not occur during the message transfer operation.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

The invention provides an arrangement for avoiding deadlock in a multiprocessor computer system in which a plurality of processing nodes are interconnected by a "multiple-hop" interconnection subsystem. A multiple-hop interconnection subsystem generally is an interconnection subsystem over which at least one processing node in the multiprocessor computer system, as a source processing node, cannot transfer the information directly to at least one other processing node in the system, as a destination processing node, but instead will need to transfer the information to the destination processing node through another "intermediate" processing node.

Figure 1:
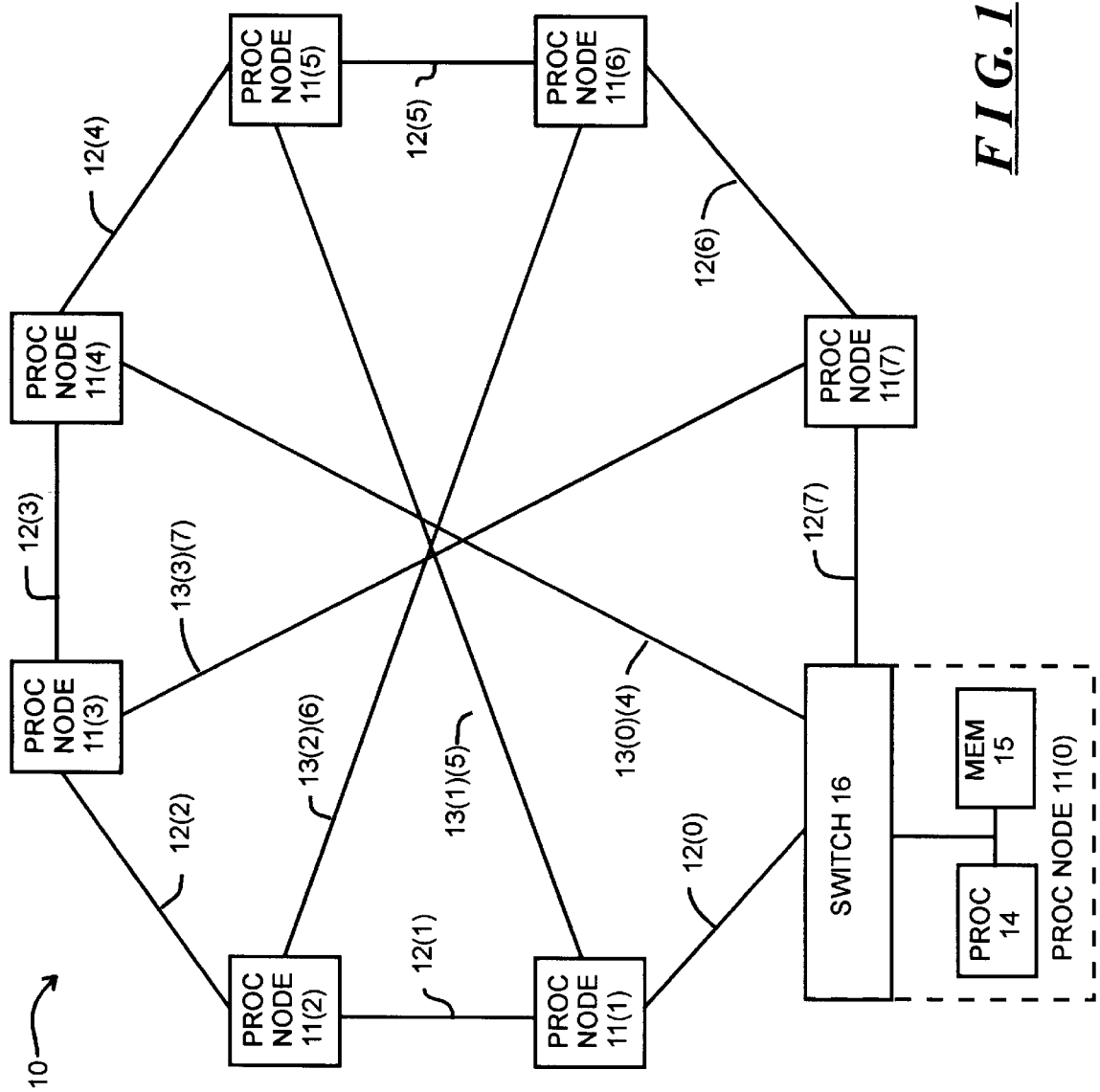
FIG. 1 is a schematic diagram of an illustrative multiprocessor computer system including an interconnection subsystem constructed in accordance with the invention.

FIG. 1 is a schematic diagram of an illustrative multiprocessor computer system 10 including an interconnection subsystem constructed in accordance with the invention. (The multiprocessor computer system 10 depicted in FIG. 1 corresponds generally to the multiprocessor computer system depicted in FIG. 7 of the aforementioned Heller, et al., patent application.) The illustrative multiprocessor computer system 10 includes eight processing nodes 11(0) through 11(7) (generally identified by reference numeral 11(n)) that are interconnected by a plurality of communication links in generally a "Moebius strip" topology, as described in the aforementioned Heller, et al., patent application. In the system 10, the processing nodes 11(0) through 11(7) are interconnected by a plurality of communication links 12(0) through 12(7) (generally identified by reference numeral 12(n)) in the form of an octagonal "cycle". In addition, opposing processing nodes 12(n) and 12(n+4) in the system are interconnected by communication links 13(n)(n+4) ("n+4" taken modulo "8"), so that processing nodes 11(0) and 11(4) are interconnected by a communication link 13(0)(4), processing nodes 11(1) and 11(5) are interconnected by a communication link 13(1)(5), and so forth.

All of the processing nodes may be generally similar, and so only one processing node, namely, processing node 11(0) is depicted in some detail. As shown in FIG. 1, processing node 11(0) includes a processor 14, a memory 15 and a switch 16. As is conventional, the processor 14, which may comprise a microprocessor, performs processing operations in connection with information stored in its memory 15, and may also perform processing operations in connection with information stored in memories (not shown) of other processing nodes 11(n) (n≠0). If the processor 14 is to perform processing in connection with information stored in memories of other processing nodes 11 (n) (n≠0), it can initiate communications through the switch 16 to enable the information to be transferred to the processing node 11(0) for processing. In addition, the processor 14 can initiate communications with another processing node 11(n) (n≠0) through switch 16 to transfer information to the other processing node 11(n) (n≠0) for storage and/or processing by the other processing node 11(n) (n≠0). Similar operations can be performed by all of the processing nodes 11(n) in the system 10. Switch 16, along with the switches of the other processing nodes 11(n), is of degree "three", that is, it provides connections to transfer information to, and receive information from, at most three other processing nodes in the multiprocessor computer system 10.

Information is transferred among processing nodes 11(n) in the system 10 over the communication links 12(n) and 13(n)(n+4). Preferably, information is transferred in the form of message packets which may have fixed or variable lengths, which will include the information to be transferred, and preferably will also include an identifier to identify the particular destination processing node that is to receive the message packet or a path indicator to identify the particular communication link or series of communication links 12(n) and/or 13(n)(n+4) to be used in transferring the message packet from the source processing node 11(n) to the destination processing node 11(n') (n'≠n). The communication links 12(n) and 13(n)(n+4) are bidirectional, that is, they can transfer messages in both directions between the processing nodes 11(n) and 11(n+1) (index "n+1" taken modulo "8"), in the case of communication links 12(n), and in both directions between the processing nodes 11(n) and 11(n+4), in the case of communication links 13(n)(n+4). The communication links may comprise any suitable communications media, including, for example, wires for transferring electrical signals, optical fibers for transferring optical signals, and the like. When a processing node, such as processing node 11(0), is to transfer information to another processing node, its switch 16 will initially transfer a message packet containing the information, along with a destination identifier identifying the destination processing node, over one of the communication links that is connected thereto. Thus, if, for example, processing node 11(0) is to transfer information to one of the adjacent processing nodes 11(1), 11(7) or 11(4), the switch 16 of processing node 11(0) will transfer the message packet over respective communication link 12(0), 12(7) or 13(0)(4). When the processing node 11(1), 11(7) or 11(4) connected to the communication link 12(0), 12(7) or 13(0)(4) receives the message packet, it can examine the identifier to determine that it is the intended destination processing node, and use the information contained in the message packet. Similar operations can be performed by other processing nodes 11(n) (n≠0) to transfer information to their respective adjacent processing nodes 11(n') (n'≠n).

On the other hand, if the processing node 11(0) is to transfer information to a non-adjacent processing node 11(n), the switch of processing node 11(0) can initially transfer the information over any of the communication links 12(0), 12(7) or 13(0)(4) to the switch (not shown) of respective processing node 11(1), 11(7) or 11(4). The processing node 11(1), 11(7) or 11(4) that receives the message packet will, as above, examine the destination identifier and determine that it (that is, the processing node) is not the destination processing node, and will forward the information to the processing node over another communication link connected thereto. For example, if processing node 11(0) is to transfer information to the processing node 11(2), it can initially transfer a message packet containing the information and the destination identifier identifying processing node 11(2) as the destination, over communication link 12(0) to the switch of processing node 11(1). Processing node 11(1) will, after receiving the message packet, determine from the destination identifier that it (that is, processing node 11(1)) is not the destination processing node, and will forward the message packet to the destination processing node 11(2) over communication link 12(1).

Similarly, if processing node 11(0) is to transfer information to the processing node 11(6), it can initially transfer a message packet containing the information along with a destination identifier identifying processing node 11(6) over communication link 12(7) to the switch of processing node 11(7). The switch of processing node 11(7), in turn, after examining the destination identifier and determining that processing node 11(6) is the destination processing node, will forward the message packet to processing node 11(6) over communication link 12(6). On the other hand, if processing node 11(0) is to transfer information to the processing node 11(3) or 11(5), it can initially transfer the information, along with the appropriate destination identifier, in a message packet over communication link 13(0)(4) to the switch of processing node 11(4), which in turn will forward the message packet over communication link 12(3) or 12(4) to respective destination processing node 11(3) or 11(5).

Similar operations can be performed by other processing nodes 11(n) (n≠0) to transfer information to their respective adjacent and non-adjacent processing nodes 11(n') (n'≠n). It will be appreciated that, for any information transfer from any one processing node 11(n), as a source processing node, to another processing node 11 (n') (n'≠n) as a destination processing node, transfers over at most two communication links 12(1) are required, in which case the system 10 has a diameter of "two", that is, at most two "hops" are required to transfer information from any processing node 11(n) as a source processing node, to any other processing node 11(n') (n'≠n) as a destination processing node.

Although the processing node 11(0) has been described as including only a processor 14, memory 15 and switch 16, it will be appreciated that the processing node 11(0), as well as other processing nodes 11(n) (n≠0) may additionally have a variety of other components and elements. For example, a processing node 11 (n) may include a number of diverse types of input/output subsystems (not shown), including mass storage subsystems, operator input and output subsystems, network ports and the like. The mass storage subsystems generally provide long-term storage for information which may be processed. The mass storage subsystems may include such devices as disk or tape subsystems, optical disk storage devices and CD-ROM devices in which information may be stored and/or from which information may be retrieved. One or more of the mass storage subsystems may utilize removable storage media which may be removed and installed by, for example, an operator, which may allow programs and data to be loaded into the digital computer system 10 and processed data obtained therefrom. Under control of control information provided thereto by the processor 14, information stored in the mass storage subsystems may be transferred to the memory 15 for storage or to other processing nodes for processing. In addition, the processor 14 may also enable the mass storage subsystems to retrieve the processed data from the memory 15 or receive information transferred to the processing node by other processing nodes for relatively long-term storage.

The operator input and output subsystems generally provide an operator interface to the processing node 11(0), which may also thereby provide an operator interface to the multiprocessor computer system 10. In particular, the operator input subsystems may include, for example, keyboard and mouse devices, which an operator may use to interactively input information for processing. In addition, the operator input subsystems may provide mechanisms whereby the operator may control the processing node 11(0) and multiprocessor computer system 10. The operator output subsystems may include devices such as video display devices, through which results of processing may be displayed to the operator. In addition, a printer may be provided to provide a hardcopy output for the operator.

As noted above, the invention provides an arrangement for avoiding deadlock in multiprocessor computer system 10 in which a plurality of processing nodes 11(n) are interconnected by a "multiple-hop" interconnection subsystem. It is well known that deadlock can occur in a cyclic interconnection subsystem, such as that defined by communication links 12(n) interconnecting the processing nodes 11(n), as described in, for example, K. Hwang, *Advanced Computer Architecture: Parallelism, Scalability Programmability*, (McGraw-Hill, Inc., 1993), at pages 380–381. That deadlock can occur in the interconnection subsystem of the multiprocessor computer system 10 will be appreciated from the following examples. In one example, it is assumed that each processing node 11(n) is to transmit a message packet to its neighboring processing node 11(n+1), and that each processing node 11(n) has a single buffer for storing a message packet. In that case, since the buffers of all of the processing nodes 11 (n+1) are full with message packets to transmit, there are no buffers at their neighboring processing nodes 11(n+1) in which a message packet can be accommodated. Accordingly, none of the processing nodes 11(n) can transmit, effectively placing the system 10 in a deadlock condition. Similar problems arise in connection with transfers from each processing node 11(n) to respective neighboring processing node 11(n−1).

Figure 2:
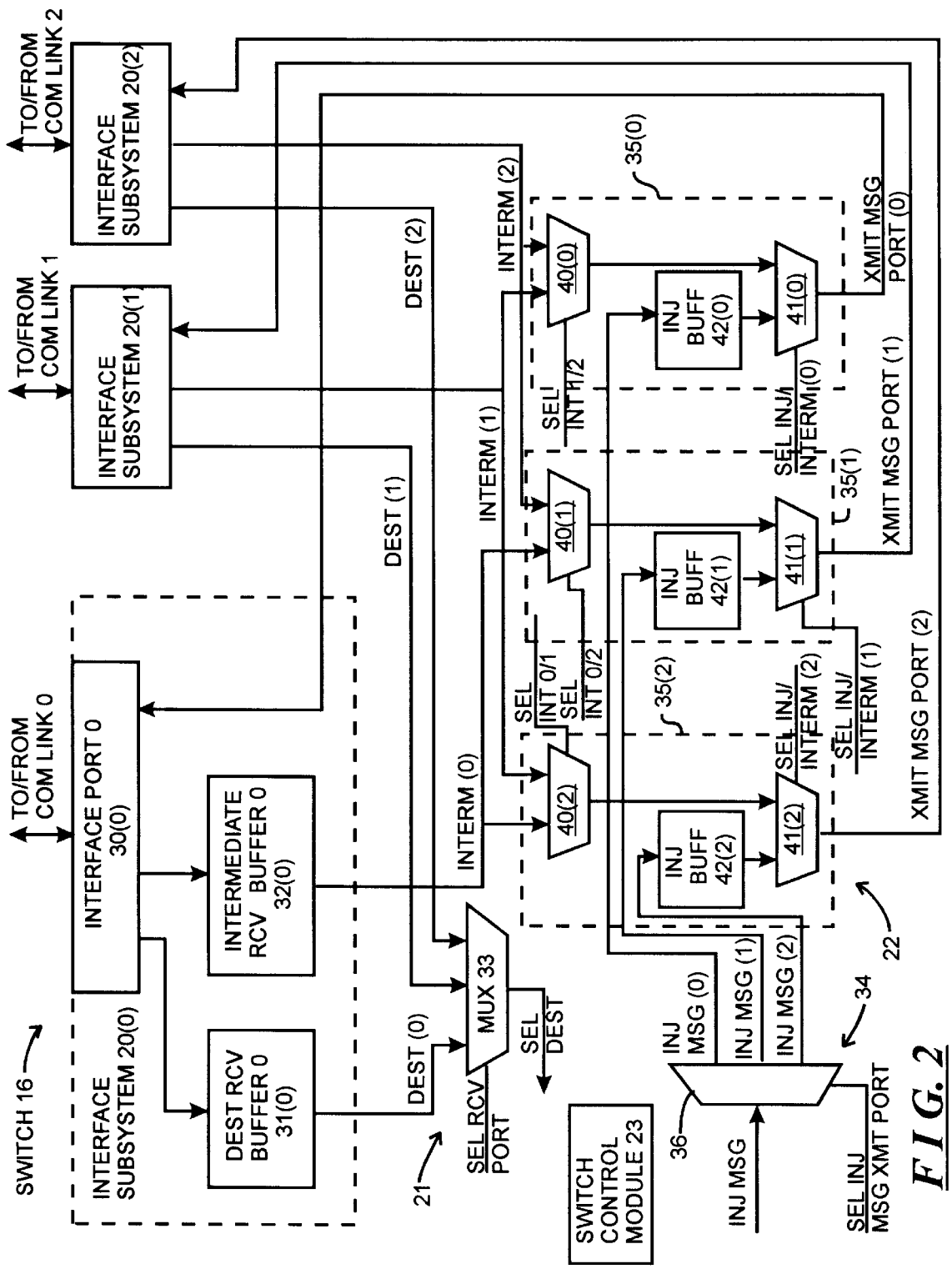
FIG. 2 is a functional block diagram of a switch useful in connection with a processing node in the multiprocessor computer system depicted in FIG. 1 structured so as to ensure that deadlocks will not occur in transferring information among processing nodes in the multiprocessor computer system.

FIG. 2 depicts a functional block diagram of switch 16 useful in the processing nodes 11(n), which alleviates the deadlock problem. With reference to FIG. 2, the switch 16 includes a plurality of interface subsystems 20(0) through 20(2) (generally identified by reference numeral 20(i)), a received message selection section 21, and a transmit message packet selection section 22, all controlled by a switch control module 23. Each of the interface subsystems 20(i) is connected to one of the two communication links 12(n) and 12(n−1) (index "n−1" taken modulo "8") or communication link 13(n)(n+4) connected to the processing node 11(n), and receives message packets that are transmitted to the processing node 11(n) over the respective communication link and transmits message packets over the respective communication link.

For message packets received by the interface subsystems 20(i) for which the processing node 11(n) is the destination processing node, received message selection section 21 selectively couples the message packets to other portions of the processing node 11(n) for processing, such as to the processor 14, memory 15 or to other elements (not shown) of the processing node 11(n) as enabled by the processor 14. If multiple message packets are concurrently received by two or more interface subsystems 20(i), the received message selection section 21, under control of the switch control module, couples successive message packets serially to the other portions of the processing node for processing.

The transmit message packet selection section 22 selectively couples message packets received by the interface subsystems 20(i) for which the processing node 11(n) is an intermediate processing node, as well as message packets to be injected by the processing node, to respective ones of the interface subsystems 20(i) for transmission. In particular, if the interface subsystem 20(0) receives a message packet for which the processing node 11(n) is an intermediate processing node, if the message packet is to be transmitted through interface subsystem 20(1) or 20(2), the transmit message packet selection section 22 will enable the message packet to be coupled to a respective interface subsystem 20(1) or 20(2) for transmission. Similarly, if the interface subsystem 20(1) receives a message packet for which the processing node 11(n) is an intermediate processing node, if the message packet is to be transmitted through interface subsystem 20(0) or 20(2), the transmit message packet selection section 22 will enable the message packet to be coupled to respective interface subsystem 20(0) or 20(2) for transmission. Finally, if the interface subsystem 20(2) receives a message packet for which the processing node 11(n) is an intermediate processing node, if the message packet is to be transmitted through interface subsystem 20(0) or 20(1), the transmit message packet selection section 22 will enable the message packet to be coupled to respective interface subsystem 20(0) or 20(1) for transmission.

In addition, the transmit message packet selection section 22 controls the injection by the processing node 11(n) of message packets into the interconnection subsystem, that is, message packets for which the processing node 11(n) itself is the source processing node. Such message packets may be provided by the processing node's processor 14, or they may be retrieved by the switch 16 from, for example, the memory 15 if the switch 16 can retrieve information from the memory in a "direct memory access" procedure. The transmit message packet selection section 22 will couple each such message packet to one of the respective interface subsystems 20(i) for transmission.

All of the interface subsystems 20(i) are similar, and only interface subsystem 20(0) is shown in detail. As shown in FIG. 2, the interface subsystem 20(0) includes an interface port 30(0), a destination receive buffer 31(0) and an intermediate receive buffer 32(0). For each message packet that is received by the processing node 11(n) over the communication link "0", the interface port 30(0) couples the message packet to one of the destination receive buffer 31(0) or the intermediate receive buffer 32(0). In particular, if the interface port 30(0) receives a message packet for which the processing node 11(n) is the destination processing node, it (that is, the interface port 30(0)) will couple the message packet to the destination receive buffer 31(0), which will buffer the packet until it (that is, the packet) is transferred by the received message packet selection section 21 to other portions of the processing node 11(n) for processing as described above. On the other hand, if the interface port 30(0) receives a message packet for which the processing node 11(n) is an intermediate processing node, it (that is, the interface port 30(0)) will couple the message packet to the intermediate receive buffer 32(0), which will buffer the packet until it (that is, the packet) is transferred by the transmit message packet selection section 22 to the appropriate interface subsystem 21(1) or 21(2) for transmission as described above.

It will be appreciated that, in receiving the message packet, the interface port 30(0) will receive the electrical, optical or other signal(s) defining a message packet from the communication link connected thereto, and convert the signal(s) as necessary to an appropriate form for loading into the respective buffer 31(0) or 32(0). In one embodiment, each message packet comprises a selected number of successively-received words, and each of the buffers 31(0) and 32(0) essentially comprises a queue in which the successive words of the respective message packets are stored. Generally, each of the buffers 31(0) and 32(0) has sufficient capacity to store words for one message packet.

As indicated above, the destination receive buffer 31(0) buffers each message packet received by the interface subsystem 20(0) for which the processing node 11(n) is the destination processing node. Under control of the switch control module 23, the destination receive buffer 31(0), will couple the successive words of the buffered message packet to the received message packet selection section 21 as a DEST(0) destination signal. As indicated above, the interface subsystems 20(1) and 20(2), connected to the other communication links to which the processing node 11(n) is connected, are similar to the interface subsystem 20(0), and when they receive message packets over their respective communication links for which the processing node 11(n) is the destination processing node, the message packets will be buffered in their respective destination receive buffers (not shown). In addition, the switch control module 23 can control the respective destination receive buffers to enable the buffered packets to be coupled to the received message packet selection section as respective DEST(1) and DEST(2) destination signals.

Similarly, the intermediate receive buffer 32(0) buffers each message packet received by the interface subsystem 20(0) for which the processing node 11(n) is an intermediate processing node. Under control of the switch control module 23, the intermediate receive buffer 32(0), will couple the successive words of the buffered message packet to the transmit message packet selection section 22 as a INTERM (0) intermediate signal. As indicated above, the interface subsystems 20(1) and 20(2), connected to the other communication links to which the processing node 11(n) is connected, are similar to the interface subsystem 20(0), and when they receive message packets over their respective communication links for which the processing node 11(n) is an intermediate processing node, the message packets will be buffered in their respective intermediate receive buffers (not shown). In addition, the switch control module 23 can control the respective intermediate receive buffers to enable the buffered packets to be coupled to the transmit message packet selection section 22 as respective INTERM(1) and INTERM(2) destination signals.

The received message packet selection section 21, under control of the switch control module 23, receives the message packets buffered by the destination receive buffers 31(0) through 31(2) and couples them to other portions of the processing node 11(n) for storage or processing. The received message packet selection section 21 comprises a multiplexer 33 that is controlled in response to a SEL REC PORT selected receive port signal from the switch control module 23. The switch control module 23, in addition to controlling the destination receive buffers of the respective interface subsystems 20(0) through 20(2), will concurrently control the SEL REC PORT selected receive port signal to enable the multiplexer 33 to, in turn, selectively couple one of the DEST(0) through DEST(2) destination signals from the interface subsystems 20(0) through 20(2) as a SEL DEST selected destination signal, which may be coupled to the processor 14 (FIG. 1).

That is, if the switch control module 23 enables the destination receive buffer 31(0) of interface subsystem 20(0) to couple the message packet buffered therein as the DEST (0) destination signal as described above, it (that is, the switch control module 23) will contemporaneously control the SEL REC PORT selected receive port signal to enable the multiplexer 33 to couple the DEST(0) destination signal as the SEL DEST selected destination signal to, for example, the processor 14. Similarly, if the switch control module 23 enables the destination receive buffer (not shown) of interface subsystem 20(1) or 20(2) to couple the respective message packet buffer therein as the DEST(1) or DEST(2) destination signal as described above, it (that is, the switch control module 23) will contemporaneously control the SEL REC PORT selected receive port signal to enable the multiplexer 33 to couple the respective DEST(1) or DEST(2) destination signal to, for example, the processor 14.

The transmit message packet selection section 22 comprises a injected message communication link selector 34 and a plurality of transmit message packet selectors 35(0) through 35(2) (generally identified by reference numeral 35(i)), with each transmit message packet selector 35(i) being associated with the correspondingly-indexed interface subsystem 20(i). The injected message communication link selector 34 comprises a demultiplexer 36 that receives an INJ MSG injected message signal, representing a message packet received from, for example, processor 14, memory 15 or other element of the processing node, and, under control of a SEL INJ MSG XMT PORT selected injected message transmit port signal from the switch control module 23, couples the INJ MSG injected message signal as a selected one of INJ MSG (0) through INJ MSG (2) injected message (0) through (2) signals to one of the transmit message packet selectors 35(0) through 35(2).

That is, if the injected message packet represented by the INJ MSG injected message signal coupled to demultiplexer 36 is to be transmitted to the processing node connected to the communication link that is, in turn, connected to interface subsystem 20(0), the SEL INJ MSG XMT PORT selected injected message transmit port signal from the switch control module 23 will control the demultiplexer 36 to couple the INJ MSG injected message signal as the INJ MSG (0) injected message (0) signal to transmit message packet selector 35(0). Similarly, if the injected message packet represented by the INJ MSG injected message signal coupled to demultiplexer 36 is to be transmitted to the processing node connected to the communication link that is, in turn, connected to interface subsystem 20(1) or 20(2), the SEL INJ MSG XMT PORT selected injected message transmit port signal from the switch control module 23 will control the demultiplexer 36 to couple the INJ MSG injected message signal as the respective INJ MSG (1) or INJ MSG (2) injected message (1) or (2) signal to respective transmit message packet selector 35(1) or 35(2).

Each transmit message packet selector 35(i), under control of the switch control module 23, selectively couples a message packet from the intermediate receive buffers of the interface subsystems 20(i')(i'≠i) or the injected message packet from the injected message communication link selector 34, to the interface subsystem 20(i) for transmission over the communication link connected thereto. All of the transmit message packet selectors 35(i) are constructed similarly. Each transmit message packet selector 35(i) includes an intermediate packet multiplexer 40(i), an transmit packet multiplexer 41(i) and an injected message packet buffer 42(i). Injected message packets coupled to the respective transmit message packet selector 35(i) by the multiplexer 36 are buffered in the injected message packet buffer 42(i). The intermediate packet multiplexer 40(i) receives the INTERM (i') and INTERM (i") (i', i"≠i) intermediate signals from the interface subsystems 20(i') and 20(i") (i', i"≠i) and, under control of a SEL INT i'/i" (i', i"≠i) select intermediate signal from the switch control module 23, couples one of the received INTERM (i') and INTERM (i") intermediate signals to one input of the transmit packet multiplexer 41(i). As described above, the INTERM (i') and INTERM (i") intermediate signals represent message packets buffered in the intermediate receive buffers of the interface subsystems 20(i') and 20(i"), and so the signal coupled by the intermediate packet multiplexer 40(i) to the transmit packet multiplexer 41(i) represent a packet from the respective intermediate receive buffer. The transmit packet multiplexer 41(i) of the transmit message packet selector 35(i), under control of the switch control module 23, selectively couples the selected intermediate message packet, represented by the signal from the intermediate packet multiplexer 40(i) or an injected packet that is buffered in injected packet buffer 42(i) as a XMIT MSG PORT (i) transmit message port (i) signal to the interface subsystem 20(i) connected thereto for transmission over the respective communication link. In particular, the XMIT MSG PORT (i) transmit message port (i) signal is provided directly to the interface port of the respective interface subsystem 20(i) for transmission.

Thus, for example, for the transmit message packet selector 35(0), the intermediate packet multiplexer 40(0) receives the INTERM (1) and INTERM (2) intermediate signals from the interface subsystems 20(1) and 20(2) and, under control of a SEL INT ½ select intermediate signal from the switch control module 23, couples one of the INTERM (1) and INTERM (2) intermediate signals to one input of the transmit packet multiplexer 41(0). The INTERM (1) and INTERM (2) intermediate signals represent message packets buffered in the intermediate receive buffers of the interface subsystems 20(1) and 20(2), and so the signal coupled by the intermediate packet multiplexer 40(0) to the transmit packet multiplexer 41(0) represent a packet from intermediate receive buffer 20(1) or 20(2). The transmit packet multiplexer 41(0) of the transmit message packet selector 35(0), under control of the switch control module 23, selectively couples the selected intermediate message packet, represented by the signal from the intermediate packet multiplexer 40(0) or an injected packet that is buffered in injected packet buffer 42(0) as a XMIT MSG PORT (0) transmit message port (0) signal to the interface subsystem 20(0) connected thereto for transmission over the respective communication link. In particular, the XMIT MSG PORT (0) transmit message port (0) signal is provided directly to the interface port 30(0) of the interface subsystem 20(0) for transmission. The transmit message packet selectors 35(1) and 35(2) are constructed and operate in a similar manner in connection with the respective INTERM (0) through INTERM (2) intermediate signals and INJ MSG (1) and INJ MSG (2) injected message signals coupled thereto.

It will be appreciated that providing each of the processing nodes 11(n) with a switch 16, including both the destination receive buffer and intermediate receive buffer for each of the interface subsystems 20(0) through 20(3) associated with each communication link 12(n) and 13(n)(n+4) connected thereto, will ensure that no deadlocks will occur in the interconnection subsystem used in the multiprocessor computer system 10 depicted in FIG. 1. Since all of the interface subsystems 20(i) include buffers for buffering message packets received by the processing node 11(n) over the communication links connected thereto, as well as separate injected message buffers for buffering message packets to be injected by the processing node 11(n), the processing node 11(n) will have sufficient buffering resources to ensure both that the processing node 11(n) can inject a message and receive messages from processing nodes 11(n+1), 11(n−1) and 11(n+4) adjacent thereto, concurrently. In addition, since each interface subsystem 20(i) includes both a buffer for buffering message packets for which the processing node 11(n) is the destination (that is, the destination receive buffer 31(i)) and a buffer for buffering message packets to be forwarded to another processing node 11(n') (n'≠n) (that is, the intermediate receive buffer 32(i)), receipt and buffering of a message packet by one interface subsystem 20(i) for which the processing node 11(n) is the destination processing node will not block subsequent receipt and buffering of a subsequent message packet by the same interface subsystem 20(i) for which the processing node 20(n) is an intermediate processing node. Accordingly, the inventive switch 16 ensures that deadlocks cannot occur in the interconnection subsystem for the multiprocessor computer system 10.

It will be appreciated that a number of modifications may be made to the invention. For example, although the system 10 has been described as comprising processing nodes interconnected by communication links in a Moebius strip topology of diameter two, it will be appreciated that the processing nodes may be interconnected in any cyclic topology of any diameter. Generally, in the case of a system of diameter "D", (D≧2), "D" hops will be required to transfer a message packet from any processing node 11(n) in the system to any other processing node 11(n')(n'≠n). In that case, the switch 16 each of the interface ports 20(i) will be provided with "D−1" intermediate receive buffers, each of which can be deemed associated with a hop. Thus, to ensure freedom from deadlock, if a message packet requires "h" hops, where h≦d, the message packet will proceed through intermediate receive buffers associated with successive hops. That is, when a processing node 11(n) receives the message packet for the "h-th" hop, the message packet can be stored in the "h-th" intermediate receive buffer, until the destination processing node receives the message packet. When the destination processing node receives the message packet, the message packet will be buffered in the destination receive buffer 31(i) (FIG. 2). In general, if "D−1" intermediate receive buffers are provided for processing nodes interconnected in a cyclic topology of diameter "D", deadlock can be avoided for any message transfer.

In addition, although the invention has been described in connection with a plurality of processing nodes whose switches 16 are of degree three, it will be appreciated that the invention can be used in connection with processing nodes whose switches of other degrees. Preferably the invention will be used in connection with systems in which the processing nodes are interconnected in a cyclic topology, which can be accomplished using processing nodes of degree other that three. It will be appreciated that the minimum number of interface subsystems 20(i) and transmit message packet selectors 35(i) (FIG. 2) in a processing node's switch 16 will generally at least correspond to the switch's degree. In addition, the number of DEST(i) destination signals received by multiplexer 33, and the number of INJ MSG (i) injected message signals provided by the demultiplexer 36, twill generally at least correspond to the switch's degree.

Furthermore, although the system 10 has been described as including bidirectional communication links 12(n) and 13(n)(n+4), it will be appreciated that each bidirectional communication link can be implemented using two unidirectional communication links which transfer message packets in opposite directions between respective pairs of processing nodes 11(n), 11(n+1) and 11(n), 11(n+4). In addition, at least some of the communication links 12(n) and 13(n)(n+4) can comprise single unidirectional communication links, which transfer message packets in only one direction between respective pairs of processing nodes.

In addition, although each interface subsystem 20(i) of the respective processing nodes 11(n) have been described as including destination receive buffers 31(i) and intermediate receive buffers 32(i) for receiving entire message packets before forwarding them through the received message selection section 21 to other elements of the respective processing node 11(n), or through the transmit message packet selection section 22 to a respective interface subsystems 20(i') (i'≠i) for transfer to another processing node 11(n') (n'≠n), it will be appreciated that some or all of the respective buffers may alternatively be constructed to receive only a portion of the respective packets before forwarding them.

Furthermore, although the invention has been described in connection with a system 10 comprising processing nodes 11(n) all of which have similar general structures, it will be appreciated that the invention may be used in connection with a system including nodes of diverse structures. Indeed, at least some nodes may be connected only to input/output devices, such as mass storage subsystems, network interfaces, interfaces to the public telephony system, hardcopy output devices and the like. In addition, the invention may be used in connection with a message packet transfer system comprising switching nodes, which may be similar to switches 16 of the processing nodes 11(n) described above, with the switching node being connected to any type of source for providing message packets for transmission or destination for receiving message packets. Other arrangements will be apparent to those skilled in the art.

In addition, although the switch 16 has been described as including a received message selection section 21, if the outputs of the destination receive buffers 31(i) of the respective interface subsystems 20(i) can be connected together in a "wired OR" connection, the received message selection section 21 can be eliminated. In that case, the switch control module 23 can generate gating signals to enable the respective destination receive buffers to gate the message packets buffered therein as the SEL DEST selected destination signal.

Similarly, while the switch 16 has been described as including the injected message communication link selector 34 including demultiplexer 36, it will be appreciated that the INJ MSG injected message signal may instead be coupled to the inputs of each of the injected message buffers 42(i), and the switch control module 23 may generate appropriate load enable signals to enable the appropriate injected message buffer 42(i) to receive and buffer the message packet to be injected.

In addition, while the transmit message packet selectors 35(i) are described as including two separate multiplexers 40(i) and 41(i), it will be appreciated that the multiplexers 40(i) and 41(i) may be combined into a single multiplexer for selectively coupling the respective INTERM (i'), INTERM (i") (i', i"≠i) signal, representing the message packets from the respective intermediate receive buffers 32(i'), 32(i"), or the buffered injected message packet from the injected message buffer 42(i), as the XMIT MSG PORT (i) transmit message port (i) signal.

It will be appreciated that a system in accordance with the invention can be constructed in whole or in part from special purpose hardware or a general purpose computer system, or any combination thereof any portion of which may be controlled by a suitable program.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A message packet transfer system comprising a plurality of switching nodes interconnected by communication links to define at least one cyclical packet transfer path having a predetermined diameter, the switching nodes transferring message packets each from a respective one of the switching nodes as a respective source switching node to a respective one of the switching nodes as a respective destination switching node, at least one of the switching nodes comprising:

A. a number of buffers, the number being a function of the predetermined diameter; and B. an interface configured to receive message packets from at least one other of said switching nodes during a message transfer operation, buffer them in said buffers, and transfer ones of said message packets for which the at least one of said switching nodes is not the destination switching node to at least a second other of said switching nodes, thereby to ensure that deadlock does not occur during the message transfer operation.

2. A message packet transfer system as defined in claim 1 in which, in said at least one switching node, one of said buffers operates as a destination buffer to buffer message packets received by said at least one of said switching nodes as a destination switching node.

3. A message packet transfer system as defined in claim 2 in which, in said at least one switching node, another of said buffers operates as an intermediate buffer to buffer message packets received by said at least one of said switching nodes for which said at least one of said switching nodes is not a destination switching node.

4. A message packet transfer system as defined in claim 3 in which the interface includes:
   C. a destination message packet transfer element configured to transfer message packets received from said at least one other of said switching node for which said at least one switching node is a destination switching node to said destination buffer for buffering, and
   D. an intermediate message packet transfer element configured to transfer message packets received from said at least one other of said switching nodes for which said at least one switching node is not a destination switching node to said intermediate buffer for buffering.

5. A message packet transfer system as defined in claim 4 in which said interface further transfers message packets to at least a second other of said switching nodes, said interface transferring message packets from said intermediate buffer to said at least a second other of said switching nodes.

6. A message packet transfer system as defined in claim 5 in which the at least one switching node is connected to a message packet generator configured to provide message packets for transfer by said at least one switching node, the interface further selectively transferring message packets received from one of the message packet generator or the intermediate buffer to said at least a second other of said switching nodes.

7. A message packet transfer system as defined in claim 1 in which the number of said buffers is selected to correspond to the predetermined diameter.

8. A message packet transfer system as defined in claim 1 in which the switching nodes transfer message packets over said communication links in one or more hops, in each hop one of said message packets being transferred by one of said switching nodes to another of said switching nodes, in said at least one of said switching nodes a buffer selected to buffer received message packet being a function of the number of hops for the message packet from the source switching node to the at least one of said switching nodes.

9. A message packet transfer system as defined in claim 1 in which a plurality of the switching nodes each have a plurality of buffers configured to buffer a corresponding plurality of message packets received thereby from respective ones of at least one other of said switching nodes during said message transfer operation.

10. A message packet transfer method for effecting the transfer of message packets in a system comprising a plurality of switching nodes interconnected by communication links to define at least one cyclical packet transfer path having a predetermined diameter, the switching nodes transferring message packets each from a respective one of the switching nodes as a respective source switching node to a respective one of the switching nodes as a respective destination switching node, the method comprising the steps of:
   A. establishing a number of buffers, the number being a function of the predetermined diameter; and
   B. receiving message packets from at least one other of said switching nodes during a message transfer operation, buffering the received message packets in said buffers, and transferring ones of said message packets for which the at least one of said switching nodes is not the destination switching node to at least a second other of said switching nodes, thereby to ensure that deadlock does not occur during the message transfer operation.

11. A message packet transfer method as defined in claim 10 in which, in said at least one switching node, one of said buffers is enabled to operate as a destination buffer to buffer message packets received by said at least one of said switching nodes as a destination switching node.

12. A message packet transfer method as defined in claim 11 in which, in said at least one switching node, another of said buffers is enabled to operate as an intermediate buffer to buffer message packets received by said at least one of said switching nodes for which said at least one of said switching nodes is not a destination switching node.

13. A message packet transfer method as defined in claim 12 in which said at least one switching node, during said message packet receiving step, performs the steps of:
   C. transferring message packets received from said at least one other of said switching node for which said at least one switching node is a destination switching node to said destination buffer for buffering, and
   D. transferring message packets received from said at least one other of said switching nodes for which said at least one switching node is not a destination switching node to said intermediate buffer for buffering.

14. A message packet transfer method as defined in claim 13 in which said interface is further enabled to transfer message packets to at least a second other of said switching nodes, said interface being enabled to transfer message packets from said intermediate buffer to said at least a second other of said switching nodes.

15. A message packet transfer method as defined in claim 14 in which the at least one switching node is connected to a message packet generator configured to provide message packets for transfer by said at least one switching node, the interface further being selectively enabled to transfer message packets received from one of the message packet generator or the intermediate buffer to said at least a second other of said switching nodes.

16. A message packet transfer method as defined in claim 10 in which the number of said buffer is selected to correspond to the predetermined diameter.

17. A message packet transfer method as defined in claim 10 in which the switching nodes transfer message packets over said communication links in one or more hops, in each hop one of said message packets being transferred by one of said switching nodes to another of said switching nodes, in said at least one of said switching nodes a buffer being selected to buffer received message packet being a function of the number of hops for the message packet from the source switching node to the at least one of said switching nodes.

18. A message packet transfer method as defined in claim 10 in which a plurality of the switching nodes each have a plurality of buffers configured to buffer a corresponding plurality of message packets received thereby from respective ones of at least one other of said switching nodes during said message transfer operation.

19. A message packet transfer computer program product for use in connection with a system comprising a plurality of switching nodes interconnected by communication links to define at least one cyclical packet transfer path having a predetermined diameter, the switching nodes transferring message packets each from a respective one of the switching nodes as a respective source switching node to a respective one of the switching nodes as a respective destination switching node, at least one of the switching nodes including a computer, the message packet transfer computer program product comprising a computer-readable medium including:

- A. a buffer establishment module configured to enable said computer to establish a number of buffers, the number being a function of the predetermined diameter and
- B. an interface module configured to enable said computer to buffer a corresponding plurality of message packets received by said computer from at least one other of said switching nodes during a message transfer operation, thereby to ensure that deadlock does not occur during the message transfer operation.

20. A message packet transfer computer program product as defined in claim 19 in which said buffer establishment module enables said computer to operate one of said buffers as a destination buffer to buffer message packets received by said computer as a destination switching node.

21. A message packet transfer computer program product as defined in claim 20 in which said buffer establishment module enables said computer to operate another of said buffers as an intermediate buffer to buffer message packets received by said computer to be transferred to another of said switching nodes as a destination switching node.

22. A message packet transfer computer program product as defined in claim 21 in which the interface module enables the computer to:
- C. transfer message packets received from said at least one other of said switching node for which said at least one switching node is a destination switching node to said destination buffer for buffering, and
- D. transfer message packets received from said at least one other of said switching nodes for which said at least one switching node is not a destination switching node to said intermediate buffer for buffering.

23. A message packet transfer computer program product as defined in claim 22 in which said interface module further enables said computer to transfers message packets to at least a second other of said switching nodes, said interface module enabling the computer to transfer message packets from said intermediate buffer to said at least a second other of said switching nodes.

24. A message packet transfer computer program product as defined in claim 23 in which the at least one switching node is connected to a message packet generator configured to provide message packets for transfer by said at least one switching node, the interface module further enabling the computer to selectively transfer message packets received from one of the message packet generator or the intermediate buffer to said at least a second other of said switching nodes.

25. A message packet transfer computer program product as defined in claim 19 in which the number of said buffer is selected to correspond to the predetermined diameter.

26. A message packet transfer computer program product as defined in claim 19, in which the switching nodes transfer message packets over said communication links in one or more hops, in each hop one of said message packets being transferred by one of said switching nodes to another of said switching nodes, the message packet transfer computer program product in said at least one of said switching nodes a buffer selected to buffer received message packet being a function of the number of hops for the message packet from the source switching node to the at least one of said switching nodes.

27. A switching node for use in a message packet transfer system comprising a plurality of other switching nodes interconnected by communication links to define at least one cyclical packet transfer path having a predetermined diameter, the switching nodes transferring message packets each from a respective one of the switching nodes as a respective source switching node to a respective one of the switching nodes as a respective destination switching node, the switching node comprising:
- A. a number of buffers, the number being a function of the predetermined diameter; and
- B. an interface configured receive message packets from at least one other of said switching nodes during a message transfer operation, buffer them in said buffers, and transfer ones of said message packets for which the switching node is not the destination switching node to at least a second other of said switching nodes, thereby to ensure that deadlock does not occur during the message transfer operation.

28. A switching node for use in a message packet transfer system comprising a plurality of other switching nodes interconnected by communication links to define at least one cyclical packet transfer path having a predetermined diameter, the switching nodes transferring message packets each from a respective one of the switching nodes as a respective source switching node to a respective one of the switching nodes as a respective destination switching node, the switching node comprising:
- A. a computer; and
- B. a control subsystem for controlling the computer, the control subsystem comprising:
  - i. a buffer establishment module configured to enable the computer to establish a number of buffers, the number being a function of the predetermined diameter; and
  - ii. an interface module configured so enable the computer to receive message packets from at least one other of said switching nodes during a message transfer operation, buffer them in said buffers, and transfer ones of said message packets for which the switching node is not the destination switching node to at least a second other of said switching nodes, thereby to ensure that deadlock does not occur during the message transfer operation.

29. A control subsystem for controlling a computer in a switching node, the switching node comprising one of a plurality of switching nodes interconnected by communication links in a message packet transfer system, the communication links interconnecting the switching nodes to define at least one cyclical packet transfer path having a predetermined diameter, the switching nodes transferring message packets each from a respective one of the switching nodes as a respective source switching node to a respective one of the switching nodes as a respective destination switching node, the control subsystem comprising:
- A. a buffer establishment module configured to enable the computer to establish a number of buffers, the number being a function of the predetermined diameter; and B. an interface module configured so enable the computer to receive message packets from at least one other of said switching nodes during a message transfer operation, buffer them in said buffers, and transfer ones of said message packets for which the switching node is not the destination switching node to at least a second other of said switching nodes, thereby to ensure that deadlock does not occur during the message transfer operation.

30. A system for distributing code stored on a computer readable medium and executable by a computer, the code including a plurality of modules each configured to control the computer, the code comprising:

A. a buffer establishment module configured to enable said computer to establish a number of buffers, the number being a function of the predetermined diameter; and B. an interface module configured to enable said computer to buffer a corresponding plurality of message packets received by said computer from at least one other of said switching nodes during a message transfer operation, thereby to ensure that deadlock does not occur during the message transfer operation.

* * * * *